R. T. GREENE.
BRUSH HANDLE.
APPLICATION FILED MAR. 24, 1919.
1,327,597.
Patented Jan. 6, 1920.
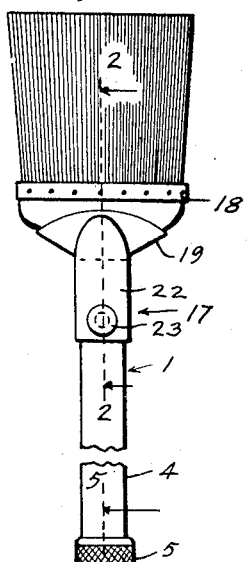
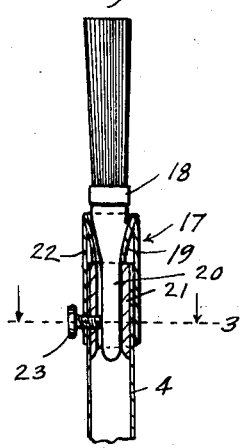
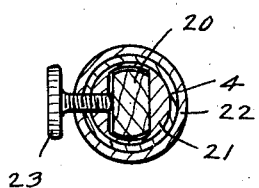
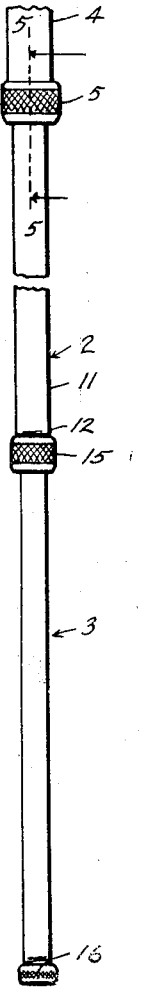
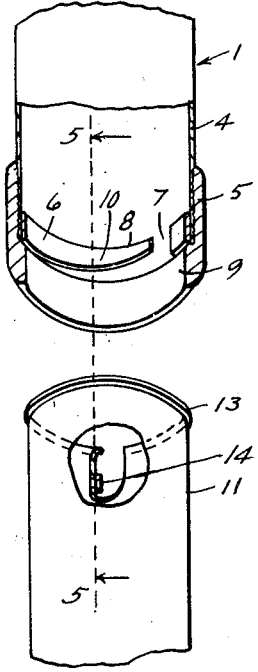
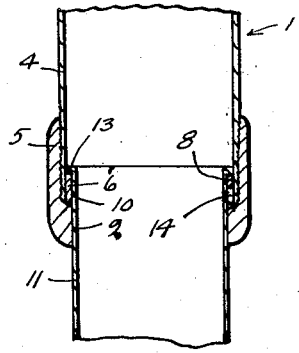
Inventor:
R. T. Greene,
by Hazard & Miller
Att'ys.

UNITED STATES PATENT OFFICE.

RICHARD T. GREENE, OF SOUTH PASADENA, CALIFORNIA.

BRUSH-HANDLE.

1,327,597. Specification of Letters Patent. Patented Jan. 6, 1920.

Application filed March 24, 1919. Serial No. 284,784.

*To all whom it may concern:*

Be it known that I, RICHARD T. GREENE, a citizen of the United States, residing at South Pasadena, in the county of Los Angeles and State of California, have invented new and useful Improvements in Brush-Handles, of which the following is a specification.

My object is to make an extension handle for brushes and the like, and my invention consists of the novel features herein shown, described and claimed.

Figure 1 is a side elevation of an extension handle, embodying the principles of my invention, with a brush mounted in the handle for use.

Fig. 2 is a fragmentary sectional detail on the line 2—2 of Fig. 1.

Fig. 3 is a cross section on the line 3—3 of Fig. 2.

Fig. 4 is a fragmentary perspective upon an enlarged scale illustrating the locking joint, parts being shown in section and the parts being disconnected.

Fig. 5 is a fragmentary sectional detail of the parts shown in Fig. 4 assembled, the view being taken on the line 5—5 of Fig. 1 and upon an enlarged scale and through the parts indicated by the line 5—5 of Fig. 4.

The extension handle shown in Fig. 1 has telescoping members 1, 2 and 3. The member 2 slides into the member 1, and the member 3 slides into the member 2, so that when the handle is collapsed it is substantially the length of the member 1. The member 1 consists of a straight tube 4 having a ferrule 5 screw seated upon its lower end. A locking band 6 is fixed by soldering, brazing or the like, in the lower end of the tube 4, there being a slot 7 through the band, and the end 8 at one side of the slot 7 being tapered. The ferrule 5 has a reduced lower end having a smooth face 9 flush with the inner face 10 of the band 6.

The member 2 is a straight tube 11 having a screw threaded lower end 12 and a flange 13 turned outwardly from the upper end thereof, and a lug 14 extending outwardly a short distance below the flange 13. The tube 11 is inserted downwardly through the tube 4 and fits the faces 9 and 10. The lug 14 passes through the slot 7 and the flange 13 engages the upper edge of the band 6, and when the tube 4 is rotated relative to the tube 11 the tapered end 8 will pass between the flange 13 and the lug 14 until the parts are tight.

A ferrule 15 is screwed upon the lower end of the tube 11. The lower end of the tube 11 is provided with a locking band similar to the band 6, and the ferrule 15 is similar to the ferrule 5 and has a smooth inner face similar to the face 9. The member 3 is identical with the member 2 except that it is of a smaller size, so that the member 3 connects with the member 2 the same as the member 2 connects with the member 1. The lower end of the member 3 is provided with a removable cap 16. When it is desired to collapse the handle the member 2 is rotated until the lug 14 passes through the slot 7 then the member 2 is pushed into the member 1 until the ferrule 15 strikes the ferrule 5, then the member 3 is rotated and pushed into the member 2, and the combined length of the collapsed handle should be short enough to be carried in a suit case, or the like.

Any suitable fitting may be provided for the upper end of the member 1 for connecting the handle to a brush, or the like, or the fitting shown may be modified to fit the brush, or implement, to which the handle is to be attached. The fitting 17 is suitable for holding a flat brush 18. A socket 19 fits the head of the brush around the handle 20, and the extension socket 21 fits the handle 20, and the socket 21 fits in the upper end of the tube 4. The bracing tube 22 fits upon the outside of the tube 4 and is soldered, or brazed, to the socket 19. A set screw 23 is inserted through the tube 22 and through one side of the extension socket 21 and engages the handle 20.

When it is desired to separate the members 1, 2 and 3, the set screw is removed and the fitting 19 and socket 21 removed so that the member 2 will pass through the member 1.

Various changes may be made without departing from the spirit of my invention as claimed.

I claim:

1. In an extension handle, a tube; a locking band fixed in one end of the tube and having a slot between its ends, and the end of the band at one side of the slot being tapered; a ferrule fixed upon the tube and having an opening mating with the opening through the band; a second tube adapted to pass through the first tube and through the band and through the ferrule; a flange extending outwardly from the end of the second tube and adapted to engage the band; and a lug extending outwardly from the second tube and adapted to pass through the slot in the band and to tighten upon the tapered end of the band, so that when tightened the second tube is firmly held in the first tube.

2. In an extension handle, a tube, a locking band fixed in one end of the tube and having a slot between its ends and the end of the band at one side of the slot being tapered, a ferrule fixed upon the tube having an opening mating with the opening through the band, a second tube adapted to pass through the first tube, through the band and through the ferrule, means mounted upon the end of the second tube adapted to engage the band, and a lug extending outwardly from the second tube adapted to pass through the slot in the band and engage the tapered end thereof whereby the second tube may be firmly held in the first tube.

In testimony whereof I have signed my name to this specification.

RICHARD T. GREENE.